United States Patent
Schelberg, Jr. et al.

(10) Patent No.: US 6,314,169 B1
(45) Date of Patent: *Nov. 6, 2001

(54) POWER AND TELECOMMUNICATIONS ACCESS VENDING MACHINE

(75) Inventors: Charles C. Schelberg, Jr., Milford; Thomas M. Duff, Jr., Nashua, both of NH (US)

(73) Assignee: PowerOasis, Inc., Nashua, NH (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/594,028

(22) Filed: Jun. 15, 2000

Related U.S. Application Data

(63) Continuation-in-part of application No. 09/156,487, filed on Sep. 18, 1998, now abandoned, which is a continuation of application No. 08/796,562, filed on Feb. 6, 1997, now Pat. No. 5,812,643.

(51) Int. Cl.[7] ................................................. H04M 11/00
(52) U.S. Cl. ................................. 379/93.12; 379/110.01; 379/143; 235/381; 700/231; 902/31; 320/111
(58) Field of Search .............................. 379/91.01, 91.02, 379/93.12, 93.37, 110.01, 111, 114, 143, 144, 100.14, 100.03, 100.04; 235/381, 380; 902/22, 24, 30, 31; 320/109, 111; 700/231

(56) References Cited

U.S. PATENT DOCUMENTS 5,812,643 * 9/1998 Schelberg, Jr. et al. .......... 379/93.12

* cited by examiner

*Primary Examiner*—Wing F. Chan
(74) *Attorney, Agent, or Firm*—Smith Patent Office

(57) ABSTRACT

A vending machine for dispensing power and telecommunications access is disclosed. The vending machine has an optional switchable power circuit that receives power from a power source and delivers the power to the customer's equipment via a power connector under the control of a central control unit. A customer interested in purchasing power or using the telecommunications access makes a payment into the payment processing unit which forwards the payment information to the central control unit. From time to time the central control unit reports the transaction information to a central computer system via its modem which is connected to a telecommunication channel. Access to the same telecommunication channel or another channel can be made available to the customer via a switchable telecommunications access circuit which is also under the control of the central control unit. The customer connects to the telecommunications channel via the telecommunications access connector. The central control unit provides information on the progress of the vending transaction to the customer via the user interface. The central control unit determines when the transaction is completed by sensing the cessation of power usage via the power usage detection circuit or via customer action at the user interface. The vending machine may be incorporated within a storage locker, or may be incorporated with telephones in telephone booths, kiosks, and similar structures. The vending machine may also be used to dispense electricity, telecommunications channel access and other utilities to buildings and vehicles, including cars, boats and airplanes.

66 Claims, 12 Drawing Sheets

POWER AND TELECOMMUNICATIONS ACCESS VENDING MACHINE

CROSS REFERENCE TO RELATED APPLICATIONS

This application is a continuation-in-part of U.S. patent application Ser. No. 09/156,487, filed Sep. 18, 1998, now abandoned, which is a continuation of application Ser. No. 08/796,562 filed Feb. 6, 1997, now U.S. Pat. No. 5,812,643.

BACKGROUND OF THE INVENTION

1. Field of the Invention

This invention relates generally to the vending of electricity, telecommunications and/or other utilities in public or semi-public places. More specifically, this invention relates to the operation of computers and other electrical and electronic devices while traveling away from home.

2. Discussion of the Related Art

In this era of communications, individuals are increasingly dependent on a variety of electronic devices to receive and send information. This dependency has resulted in a large number of battery-operated devices which allow an individual to stay in touch while traveling. A major limitation in the operation of these devices is battery life. To overcome this limitation, many of these devices can operate on and recharge from an AC power line. However, AC power for this purpose is not readily available in most public and semi-public places including airports, bus terminals, convention centers and restaurants.

Portable computers have become indispensable communications tools that are used to send and receive voice, fax, email and video messages from and to almost any point in the world. These devices access a variety of communication networks via wired, wireless or fiber telecommunications channels. However, computer compatible access to telecommunications channels is also not readily available in public and semi-public places.

Malaspina (U.S. Pat. No. 5,544,784) addresses the battery life issue and tries to solve it by vending recharged batteries. This proposed solution to the problem is complicated by the shapes, sizes, and electrical characteristics of the many batteries on the market.

A more general solution to the problem is found in those parking meters which provide AC power for an engine block heater or battery charger. Wilkinson (U.S. Pat. No. 5,263,565) defines a combination meter that can allocate a payment between an electricity account and a parking space account automatically based upon whether electricity is being used or not. However, his invention is fundamentally a parking meter and he does not provide for vending power without the parking space. Further, there is no protection from the weather as it was not contemplated that the electricity would be useful for another purpose. Furthermore, while this invention does provide for credit card payments, it does not provide for a telecommunications link for payment or other information.

Ng et al. (U.S. Pat. No. 5,103,957) defines a microprocessor-based parking meter without any power vending capability or ability to accept credit card payments. This invention includes a wireless communications interface for communications between the microprocessor and an external device. Like Wilkinson, Ng is based upon the concept of renting a parking space. The communications interface is intended to connect to a portable computer that is used to change rates within the meter.

Other combination meters have been defined for the purpose of charging electric vehicles. These meters require specific means for connecting to the vehicle, specific means of charging the vehicle's batteries and/or specific means for measuring/metering the power consumed. Most importantly, these combination meters rent space for a vehicle so that the fee charged is for parking space rental and for electricity. Additionally, none of these meters is designed to operate a computer.

Some vending machines have also been defined for the purpose of charging electric vehicles. Like the combination meters, these vending machines require specific means for connecting to the vehicle, specific means for charging the vehicle's batteries, and/or specific means for measuring/metering the power consumed. Most importantly, these machines incorporate battery charging circuitry and are only capable of charging car batteries, not operating customer equipment such as computers.

Some telecommunications channels that are accessible in public places may come with a communications instrument such as a payphone, pay facsimile or pay TV. Some of these payphones used in conjunction with a telecommunications channel have an RJ11 receptacle that is intended to connect special accessories for the physically impaired and which might be able to be used for a computer connection. However, these payphone installations do not provide AC power to operate an accessory or a computer and are limited to providing access to the telephone network line connected to the payphone. These payphones cannot and do not provide fiber, cable or other types of communications channel access. Further these payphones that do accept credit cards as a means of payment still require the central office to process the transaction before the phone can be used.

SUMMARY OF THE INVENTION

An object of this invention is to provide access to electrical power, a telecommunications channel or channels and/or other utilities or services for a fee. The customer determines the method of payment, the length of time of access and which of the utilities or services to utilize. The fee is based upon the length of time of access and which utilities or services are accessed.

This invention provides access to one or more utilities after the customer provides payment in electronic form (e.g. credit card, debit card, smart card, or other forms of electronic or magnetic currency devices) or, optionally, currency. Alternatively, no physical payment method is required, and payment is carried out through software that is present in the user's laptop or other device. In still another option, payment is not made during the transaction, and the user is identified through some type of authentication. These can include RF ID cards, hotel keys, ID cards, software or anatomical characteristics such as fingerprint, voiceprint or retinal pattern identification. The customer selects which utilities or services they require, typically by just connecting to the appropriate connector (also know as outlet, receptacle, or plug) either through physical means or through wireless connections such as infrared. The transaction then begins when some form of payment or user identification is received. The transaction ends when the customer disconnects from all of the connectors or otherwise indicates that the customer is finished. The microprocessor controls the vending process and records the transaction information in retentive memory.

This microprocessor also communicates with the customer via a user interface to provide details on the progress of the transaction. The user interface is not particularly limited and need not even include a visual display on the vending machine. Periodically, this microprocessor is called by a central computer system over a telecommunication channel and may be requested to call back to the central computer. This vending device then calls the central computer and transfers all transaction data, machine status and related information to the central computer. After the data has been transferred to the central computer, the central computer can download any new data, such as new rates, to the vending device. This device does not need to know the rates in effect unless it is accepting payment in currency form or from pre-paid electronic cards or pre-paid laptop software (i.e. "e-money"). In fact, using the software forms of payment such as billing through an Internet service provider (hereinafter "ISP") or using software "currency", no physical payment method need be included in the vending machine. The central computer summarizes the data and processes the payment information and schedules technicians to visit those units that require maintenance or have full coin/currency boxes.

When this invention is used to vend power, the power may come from an internal power source (such as a battery) or one or more external power sources. The type of power source is not limited to 120 VAC, 60 Hz power. For example, the unit may obtain power from a different power source and change it to 120 VAC for a traveler. Examples of different local power sources include 220 VAC, 50 Hz and 100 VAC, 50 Hz. The unit may have a local power source connector on it as well for those customers who have equipment that can utilize the local power source. The power may also pass through a noise and surge protection circuit before it is provided to the customer's equipment. Where more than one power source is available, the customers select the source they require by plugging their equipment into the appropriate connector.

Vending telecommunications channel access includes providing access to the high speed data channels that are emerging for computer use as well as the typical telephone networks and cellular lines. These various telecommunications channels, which include ISDN, T1, T3, cable, SONET, xDSL, broadband, baseband and other channels, have not previously been available for a fee in public and semi-public locations.

The vending machine with a high speed data line can be used to provide customers with voice communication capabilities via the Internet or other voice over data networks. These so-called "Internet phones" can use data lines to call anywhere in the world and bypass the traditional telephone system (plain old telephone system, hereinafter POTS) which is often more expensive than Internet connections. The vending machine could have an Internet compatible, telephone style handset or other microphone/speaker setup for an Internet phone.

Similarly, the vending machine could use high-speed data lines and video cameras to provide customers with video phone capability via the Internet or other data networks so that the person on the other end can see as well as hear the caller.

Current payphones require central office support to enable a transaction (call). This invention allows the transaction regardless of the capabilities of the central office. In some alternative embodiments of the invention, more than one telecommunications channel will be available to the customer. In such a case, the customer will normally choose the required channel by plugging the equipment into the appropriate connector or by connecting through infrared or other wireless connection. One example of a wireless connector is an armored fiber optic cable that could be permanently attached to the unit. At the other end is a large mechanical clip. The armored fiber optic would enter into the back of the clip. The user who had a notebook computer with an IR port would place the clip on the notebook so it is grasping the top and bottom of the notebook. In this arrangement, the end of the armored fiber optic cable is aimed directly into the IR port of the laptop.

Another object of this invention is to provide a secure area, such as a storage locker, in which a customer can leave their electronic and electrical devices. While the devices are in this secure area, they can recharge their batteries and/or perform autonomous operations such as upload and download messages. In this case, the invention can incorporate a storage locker or other structure with a locking cover.

Another object of this invention is portability. Using an internal power source and wireless telecommunications channels, this invention is not limited to a fixed location. In this configuration, the invention could be used at fairs, outdoor concerts and similar sites where permanent installations are not cost effective. In these cases, it might be more cost effective to have one control unit operating multiple vending machines. These multiple vending machines may be arranged in the form of a kiosk to allow multiple customers access to the vending machine at the same time. Similarly, almost any combination of functional components of the vending machine could be moved to a location remote from the machine. This could be accomplished, for example, by networking a cluster of machines to a server either on site or at a remote location.

The invention is envisioned to have, but not limited to, the following applications:

Vending electric power at airports and other public places for any electrical device including, but not limited to, computers, cell phones, pagers and vehicles;

Vending telecommunications channel access at airports and other public places for any communications device including portable computers and special telecommunications devices for the physically impaired;

Vending the combination of power and telecommunications access onboard moving vehicles such as ships, airplanes and buses;

Vending power, communications and other utilities at rental properties, public playgrounds and camp sites;

Vending telecommunications access and electricity or other fuel to vehicles where communications is also useful for vehicle diagnostics or customer communications while re-fueling or while parked;

Vending power and optionally telecommunications access to electronic equipment locked in storage lockers to allow batteries to recharge and/or to allow autonomous operations such as upload and download messages while the customer is otherwise occupied.

Vending power and other utilities to building operations to facilitate and monitor cleaning or other repair and maintenance activities.

Other objects, features, and advantages of the invention will be apparent from the following detailed description taken in conjunction with the accompanying drawings wherein preferred embodiments of the invention have been selected for exemplification and from the individual features and relationships of the respective appended claims.

BRIEF DESCRIPTION OF THE DRAWINGS

The above and other objects and features of the present invention will be clearly understood from the following description with respect to a preferred embodiment thereof when considered in conjunction with the accompanying drawings, wherein the same reference numerals have been used to denote the same or similar parts or elements, and in which.

DETAILED DESCRIPTION OF THE PREFERRED EMBODIMENTS

Figure 1:
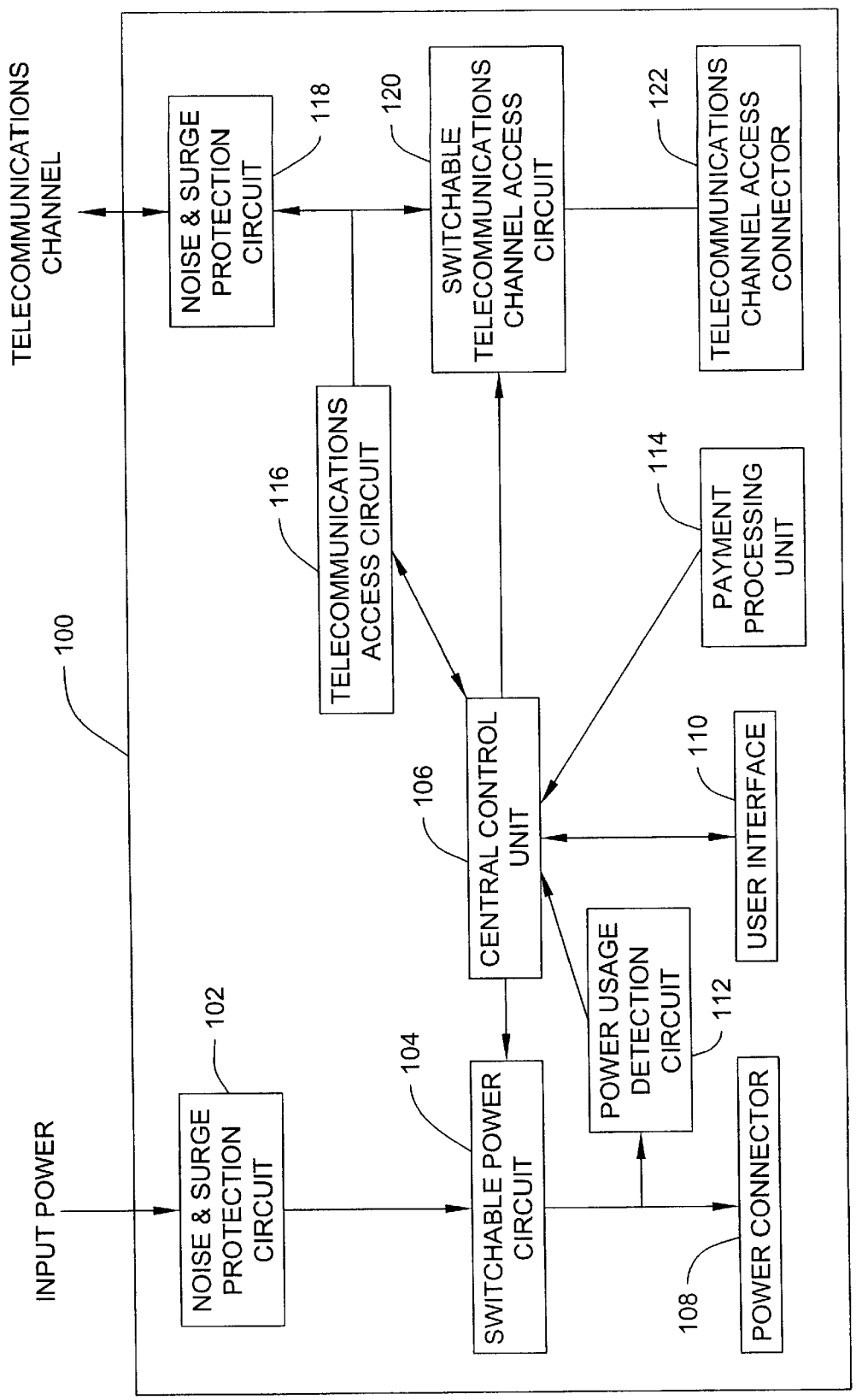
FIG. 1 is a block diagram of a first embodiment of the present invention for vending both power and telecommunications channel access.

While this specification concludes with claims defining the features on the invention that are regarded as novel, it is believed that the invention will be better understood from a consideration of the following description in conjunction with the drawing figures, in which like reference numerals are carried forward.

Referring now to FIG. 1, a block diagram of a preferred embodiment of a power and telecommunications vending machine 100 for vending power and telecommunications channel access is illustrated. In this vending machine, a microprocessor-based central control unit 106 controls the state of a switchable power circuit 104 and a switchable telecommunications channel access circuit 120. The switchable power circuit 104 switches power on and off at the power connector 108. The switchable power circuit 104 receives input power from an external source that has been processed by the noise and surge protection circuit 102. Alternatively, no switchable power circuit is necessary, and the unit always remains in the "on" position.

Similarly, the switchable telecommunications channel access circuit 120 switches the telecommunications channel on and off at the telecommunications channel access connector 122. The switchable telecommunications channel access circuit 120 provides access to an external telecommunications channel that is protected by the noise and surge protection circuit 118.

A vending transaction starts when a customer provides payment at the payment processing unit 114 and connects to the power connector 108 and/or the telecommunications channel access connector 122. Alternatively, no payment mechanism is required, and the vending transaction starts when a customer is identified. Once identified, the user can be billed at a later date. Or, the identification is used as additional security for use in conjunction with electronic or magnetic payment cards or software e-money. Once attached and initiated, the customer can monitor the state of the vending machine and the transaction via the user interface 110. The user interface may be a visual display or some other type of progress indicator such as an auditory signal. For example, the vending machine could instruct or inform the user via an audio speaker. Alternatively, the user interface can be present inside or uploaded to the user's laptop or other device thereby obviating the need for an interface within the vending machine unit. Similarly, the use of a card access system which prevents usage by ejecting the user's card would also obviate the need for a visual or aural interface.

The transaction ends when the customer disconnects from the power connector 108 and the telecommunications channel access connector 122 or wireless connector (not shown). In a further embodiment, the connector does not employ copper wires. In this case, a light pipe (i.e. fiber optic cable connector) would be used to connect the user to the vending machine. The central control unit 106 can detect that the customer has disconnected from the power connector 108 when power usage detection circuit 112 senses that power usage has dropped to zero. The central control unit 106 uses a telecommunications access circuit 116 (such as a modem) to determine when the telecommunications channel is no longer in use. Payment information and transaction length information are retained in retentive memory within the central control unit 106. This memory retains the data in the event of a power failure.

Periodically, a central computer calls the vending machine 100 over the external telecommunications channel. If the telecommunications channel is not busy, the central control unit 106 answers the call using the modem 116 and hangs up to prevent unauthorized access. After hanging up, the central control unit 106 uses the modem 116 to call a pre-programmed number for the central computer and then transfers all transaction and payment information in retentive memory to the central computer.

The fee charged for the transaction is a function of the convenience of the vending machine 100 and the length of time that the customer uses the machine, not on how much power is consumed. As a result, metering of power is not necessary.

In this preferred embodiment, the payment processing unit 114 can accept payment in currency, coin or electronic form. The electronic forms include, but are not limited to, credit cards, debit cards, smart cards and pre-paid cards or software payment (i.e. "e-money") in which payment is downloaded to the user's laptop and then uploaded to the vending machine. Modifications to this embodiment can include devices that only support electronic forms of payment and still other devices that only support currency/coin payment. Alternatively, the payment step can be substituted with an authentication step whereby once the user is verified through some form of authentication the vending can proceed.

The modem 116 is only available to and used by the central control unit 106. In a modification of this embodiment, the modem 116 can also be made available to the customer. For this modification, an extra connector is present that allows the customer to connect from their serial, parallel or other I/O port to the modem 116. This extra connection can also allow high speed communications without forcing the customer to invest in their own expensive or bulky external modem. In this embodiment, the user first calls the central control unit. The central control unit then calls an ISP in the area that services the particular unit. The ISP then sets up the connection to the unit. The lines may be high bandwidth data lines that are not "dial up" lines but which are set up in advance. In one embodiment, the user has a high speed modem in their laptop, and the vending machine simply gateways the user's modem's signal. In another embodiment, the user uses a high speed modem in the vending machine which gateways those signals to high bandwidth lines.

It is possible also to have two separate telecommunications lines connected to a device. One line can be dedicated to the vending device and the other line can be dedicated to the customer. Or, a single line can be shared between multiple terminals. This is particularly feasible when sharing a high bandwidth data line. The high bandwidth line will be brought into the server, and it will be electronically shared with the various vending terminals. It is possible to provide more than one type of telecommunications channel to the device. These types include, but are not limited to T1, ISDN, xDSL, broadband and baseband. For example, if these lines are provided, two lines can be regular phone lines and one can be an ISDN line. In such a situation, the customer would have access to connect their device to a RJ-11 connector or an ISDN connector. The remaining phone line could then be dedicated for use by the vending device. Recently, there has been a proliferation of different types of connectors for high speed telecommunications. Suitable connectors can be determined by those skilled in the art.

The central control unit 106 is autonomous and controls the operation of the vending machine 100 completely. It typically does not seek preapproval for the transaction to begin. It is possible to modify this and require the central control unit 106 to contact a central computer and obtain payment approval before allowing a transaction to begin. It is noted that in some instances, no bank authorization is required. In this case, upon successful connection to the vending machine, the vending machine calls a billing computer for payment authorization. The billing computer would approve or disapprove the transaction based on information stored in the billing computer. This obviates the need to contact a bank for approval.

In FIG. 1, the vending machine 100 only vends power and telecommunications access. In a modification of this embodiment, the machine can be designed to vend one or more additional utilities or services such as natural gas or steam. This device would be used for vending utilities or services to buildings or vehicles. For this and other uses, the vending machine could contain multiple types of power connectors. For instance, one connector may provide low current and another connector may provide higher current for such applications as building maintenance tasks like vacuum cleaners, floor polishers, etc. The high current connector may be housed within the vending machine or it can be located remotely from the vending machine, and the unit would remotely turn the connector on and off. The vending machine's higher current connectors would be controlled by a swipe card or other magnetic/electronic card in the event it is desirable for the building to charge for all power usage. The high current connectors can be housed with the unit or left in the wall in the vicinity of the vending machine and controlled remotely. An additional application for these high current connectors is to provide means for cleaning, security or other building personnel to indicate their presence at the unit at a particular time. Then, the building management company can monitor the progress of these personnel.

In another modification of the power and telecommunications vending machine, the power usage detection circuit 112 can be removed. For this device, the user interface 110 includes a push-button, or similar device, that allows the customer to terminate the transaction.

Other modifications of the power and telecommunications access vending machine eliminate one or both of the noise and surge protection circuits 102 and 118 without effecting the function of the machine. It is also possible to have multiple noise and surge protection circuits 102 and 118, one for each power source and one for each telecommunication channel. Those preferred embodiments with multiple power sources are provided in markets where the customer may require different voltage/frequency operation such as 115 VAC @ 60 Hz, 220 VAC @ 50 Hz and others such as 100 VAC @ 50 or 60 Hz.

When multiple power sources are provided, multiple power connectors 108 are also provided. Multiple power connectors 108 can also be provided in certain markets where the customer may require different mechanical forms for the same power such as the many European versions of the power connector. In this case, the vending machine would connect to a external power source, such as a European power source, and then utilize a power conversion circuit to convert to 120 VAC, 60 Hz for travelers in need of compatible power. In addition, certain preferred embodiments have an internal power source for use in markets where external power is not available.

Similarly, multiple telecommunications channels are provided in certain preferred embodiments for markets where the customer may require different performance choices such as ISDN, cable and standard telephone lines. When multiple telecommunications channels are provided, multiple telecommunications channel access connectors 122 are also provided. Multiple telecommunication channel access connectors 122 are also provided in certain preferred embodiments for markets where the customer may require different mechanical forms for the same telecommunications channel such as the many European equivalents of the RJ-11 connector. In another embodiment, the user would be able to select an ISP of their choice. The user could prearrange with the vending machine company for access to a particular ISP. The server would then call the ISP and make the network connection with the ISP.

Figure 2:
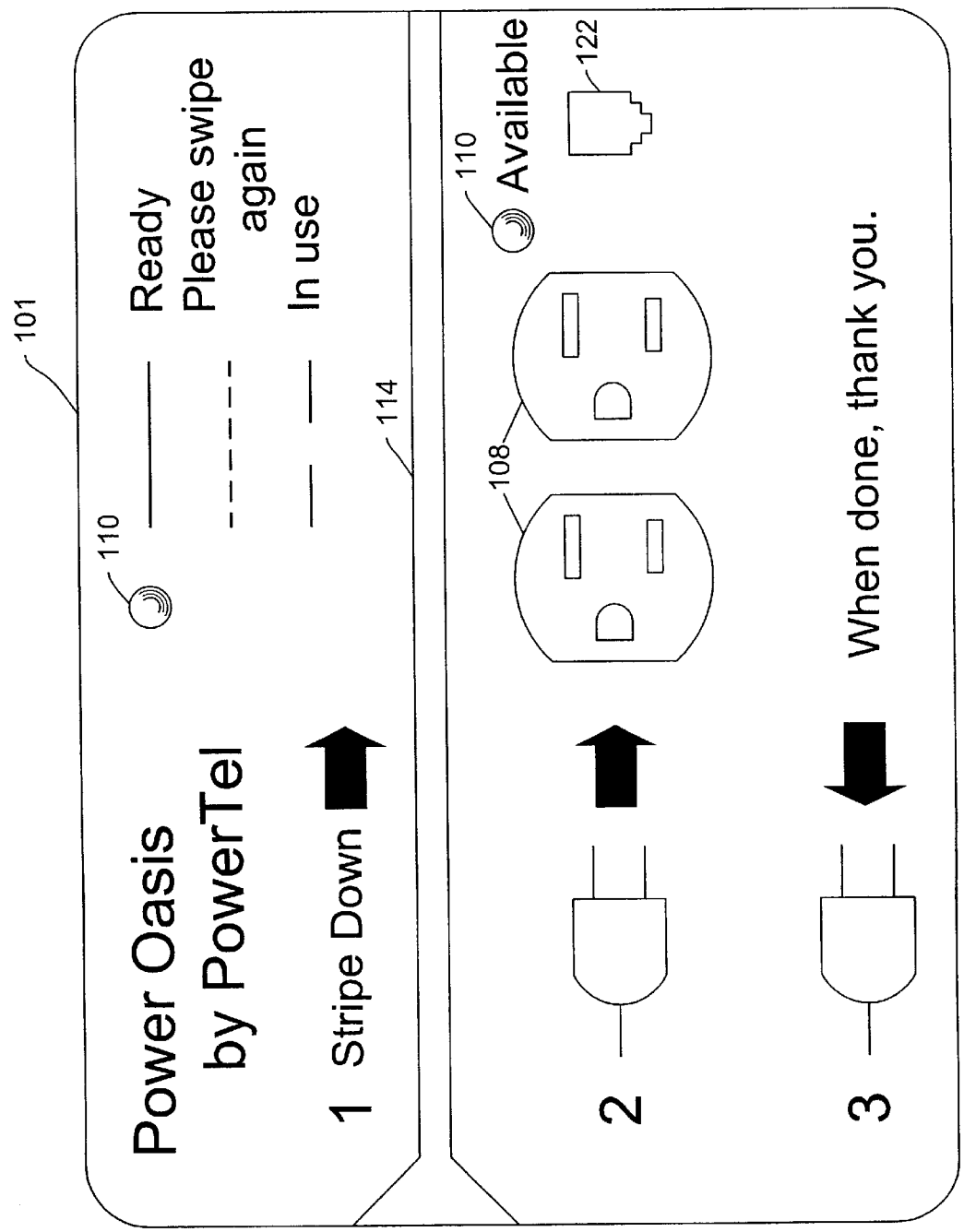
FIG. 2 is a simplified front view of a vending machine operating panel based upon the vending machine of FIG. 1.

Referring now to FIG. 2, there is illustrated a simplified front view of an operating panel of one implementation of the vending machine 100 described in the preceding paragraphs. The customer sees an operating panel 101 with a user interface 110 comprising two lights referred to as READY and AVAILABLE. The operating panel 101 includes a payment processing unit 114 in the form of a credit card swipe reader; a power connector 108 in the form of a standard duplex, 115 VAC connector; and a telecommunications channel access connector 122 in the form of a standard RJ-11 telephone line connector.

When the customer first approaches the vending machine 100, the READY light is on. The customer swipes their credit card through the credit card reader 114 and plugs their equipment into the appropriate connectors 108 and/or 122. If the central control unit 106 receives valid card information from the credit card reader 114, it 1) turns on power to the duplex connector 108 via the switchable power circuit 104, 2) turns on telecommunications channel access at the RJ-11 connector 122 via the switchable telecommunications channel access circuit 120, 3) turns on the AVAILABLE light 110, and 4) and pulses the READY light 110 slowly for the remainder of the transaction.

If the central control unit 106 does not receive valid data from the payment processing unit 114, it blinks the READY light 110 quickly for several seconds without enabling power or telecommunications channel access this indicates that the customer should swipe the card again or try another card.

When the customer is finished, they merely disconnect from the connectors 108 and 122 and leave. The central control unit 106 automatically senses this event, records the end of the transaction, turns off the AVAILABLE light 110 and returns the READY light 110 to be on continuously.

In the preferred embodiment of FIG. 2, the user interface comprises of three lights that turn on and off in particular patterns to inform the customer as to how the transaction is progressing. In other preferred embodiments, these lights may be replaced or augmented by a video display unit (VDU) which provides more detailed instruction to the customer on vending machine operation and detailed information on the progress of the transaction including the accumulated charges. On the other hand, no VDU or display light is required, and the user interface can be present in the user's laptop. Alternatively, a sound based interface or card reject system can eliminate the need for a display.

In certain embodiments, the VDU could be combined with a keyboard or other push-buttons that would allow the customer to select the language for the display, the connectors to be activated and, optionally, when to terminate the transaction. In the later case, the customer could push a button that would terminate the transaction and the connection, even though he had not disconnected from the connectors.

In still other preferred embodiments, the user interface includes a printer or similar device to provide the customer with a receipt for the transaction.

The central computer can also download new operating instructions, rate information and advertisements that can be displayed at the user interface thereby removing the need for changing a sign posted next to the device that contains this information.

Figure 3:
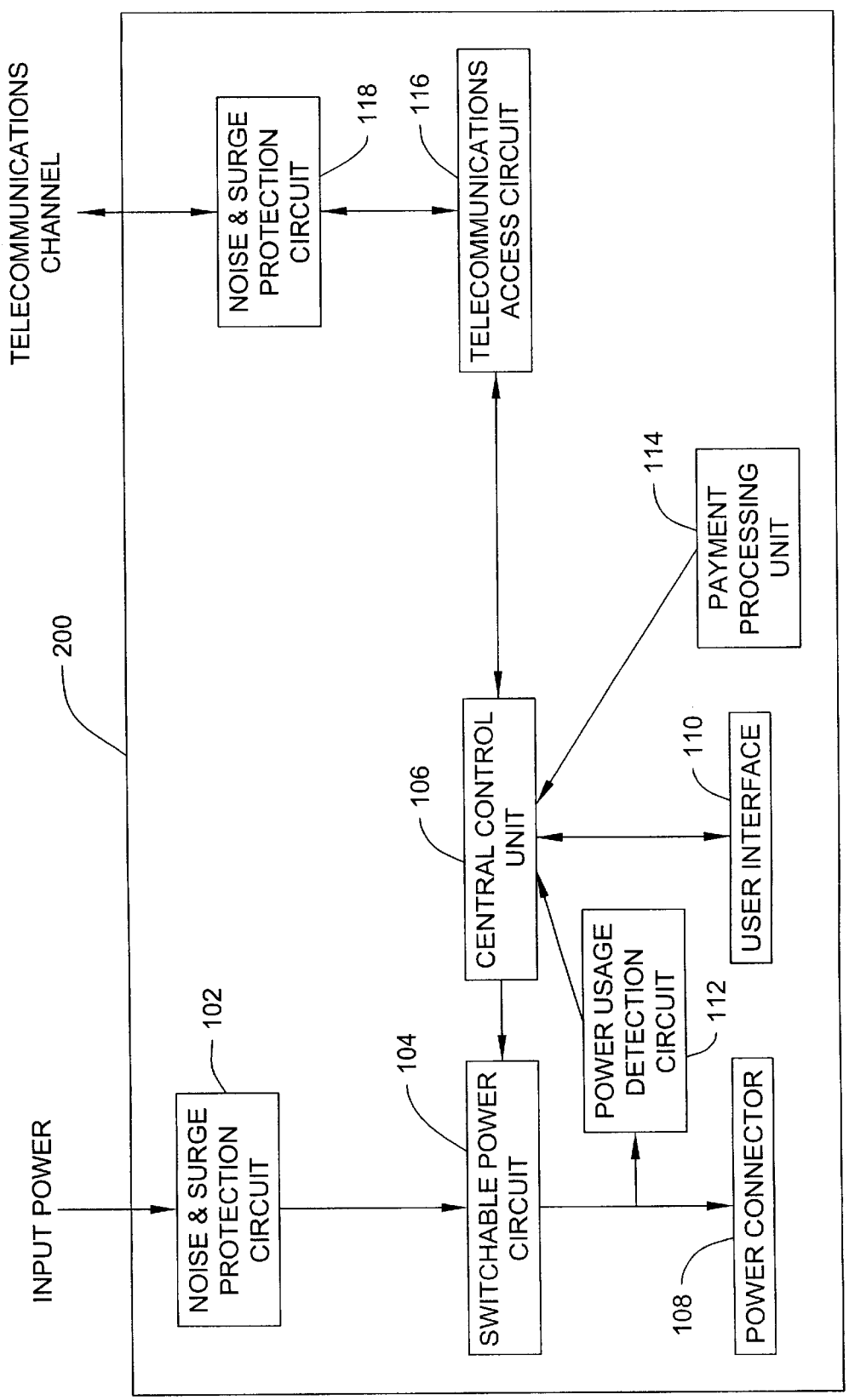
FIG. 3 is a block diagram of a second embodiment of the present invention for vending power only.

Referring now to FIG. 3, there is illustrated a block diagram of a preferred embodiment of a power vending machine 200 for vending power only. This vending machine 200 is similar to the vending machine 100 of FIG. 1 and FIG. 2, except that the switchable telecommunications channel access circuit and telecommunications channel access connector are deleted. All other components of this vending machine 200 operate in the same manner as described above. In large implementations of this vending machine 200, the power connector 108 may be a bus bar or power distribution panel for distributing large quantities of power. The fee charged in this transaction is again a function of the convenience of the vending machine 200 and the length of the transaction, not the amount of power consumed.

In this embodiment, the payment processing unit 114 can also accept payment in currency, coin or electronic form. The electronic forms include, but are not limited to, credit cards, debit cards, smart cards and pre-paid cards. Certain preferred embodiments only support electronic forms of payment and still others only support currency/coin payment. In still other embodiments, no payment mechanism is required, and software payments or billing based on authentication of the user is employed.

As in FIG. 1, the central control unit 106 is autonomous and controls the operation of the vending machine 200 completely. It can also be modified so that the central control unit 106 must contact a central computer for approval before allowing the transaction to continue and receive power.

In FIG. 3, the vending machine 200 only vends power. It can also be modified so that the machine vends one or more additional utilities or services such as natural gas or steam. This would allow for vending utilities or services to buildings or vehicles. In a particular embodiment, high power connectors are made available to building maintenance personnel, who operate the connector using an electronic or magnetic card. This provides an additional benefit to the building by providing means of tracking the location and work efficiency of building personnel.

The power usage detection circuit 112 can also be removed from the vending machine. In this modification, the user interface 110 includes a push-button which allows the customer to terminate the transaction. Indeed, no switchable power is necessary; the unit could simply remain in the "on" position continuously.

Like the first embodiment, the noise and surge protection circuit 102 can be eliminated without affecting the function of the machine.

It is also possible to have multiple noise and surge protection circuits 102, one for each power source. Multiple power sources are provided in markets where the customer may require different voltage/frequency operation such as 115 VAC @ 60 Hz and 220 VAC @ 50 Hz. When multiple power sources are provided, multiple power connectors 108 are also provided. Multiple power connectors 108 are also provided for markets where the customer may require different mechanical forms for the same power such as the many European versions of the 220 VAC @ 50 Hz connector. In addition, it is possible to provide an internal power source for use in markets where external power is not available or in an incompatible format.

Figure 4:
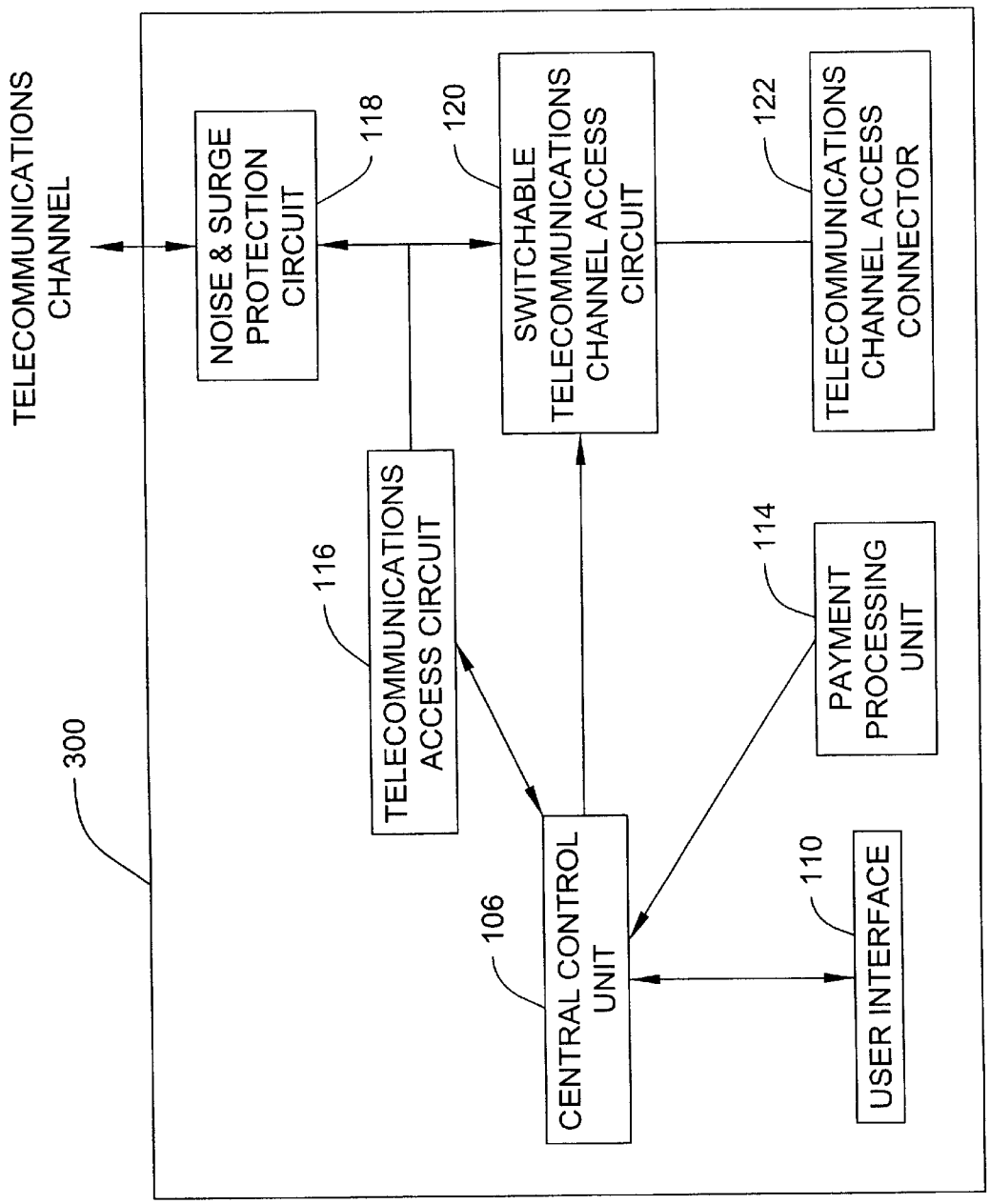
FIG. 4 is a block diagram of a third embodiment of the present invention for vending telecommunications channel access only.

Referring now to FIG. 4, there is illustrated therein a block diagram of a preferred embodiment of a telecommunications vending machine 300 for vending telecommunications channel access. This embodiment eliminates the power vending components and is particularly useful for connecting computers and other high speed telecommunications equipment to high performance telecommunications channels. All other components operate as described above.

In this preferred embodiment, the payment processing unit 114 can accept payment in currency, coin or electronic form. The electronic forms include, but are not limited to, credit cards, debit cards, smart cards, pre-paid cards. Certain embodiments only support electronic forms of payment and still others only support currency/coin payment. Still others use software payments. In still another option, payment is not made during the transaction, and the user is identified through some type of authentication. These can include RF ID cards, hotel keys, software or anatomical characteristics such as fingerprint, voiceprint or retinal pattern identification.

In the embodiment of FIG. 4, the modem 116 is only available to and used by the central control unit 106. In a modification of this embodiment, the modem 116 is also available to the customer. For this modification, an extra connector is present that allows the customer to connect their serial, parallel or other I/O port to the modem 116. This embodiment is typically used to make high speed communications available without forcing the customer to invest in their own expensive or bulky external modem.

In a further embodiment, the telecommunications port is bi-directional and can be use for both outbound and inbound calls (e.g. receiving a fax).

If high bandwidth data lines are present in the vending machine and made available to the user, some new types of applications become available. For example, a telephone style handset or other microphone/speaker system would allow the user to place voice calls over a network via data lines. This so-called Internet phone offers the advantages of bypassing the POTS and offering reduced long distance rates. With the addition of a video camera either in the vending machine or the user's laptop, the vending machine can use data lines to provide the user with video phone capability.

In one version of the device, the central control unit 106 is autonomous and controls the operation of the vending machine 300 completely. In another version, the central control unit 106 must contact a central computer for approval before allowing a transaction to begin. In still another embodiment, one control unit could operate multiple vending machines. In fact, almost any combination of functional components of the vending machine could be moved to a location remote from the machine. This means a cluster of machines could be tied in a network to a server.

Like the other embodiments, it is also possible that the machine vends one or more additional utilities or services such a natural gas or steam. This modification is used for vending utilities or services to buildings or vehicles. In these applications, a building worker such as a cleaning service would connect to high power connectors and begin service by swiping an electronic/magnetic card through the vending machine.

It is also possible to modify the embodiment of FIG. 4 to provide power at no charge for equipment that is connected to the machine.

Other possible modifications include elimination of the noise and surge protection circuit 118 providing multiple noise and surge protection circuits 118 and providing multiple telecommunications channel access connectors 122.

FIGS. 1 through 4 show the basic components of the vending machine. A preferred embodiment for the structure of a vending machine 100 includes a work surface or other place to set up a portable computer and related items, optionally a place to sit and optionally a lockable cover to allow the customer to leave their equipment unattended.

Figure 5:
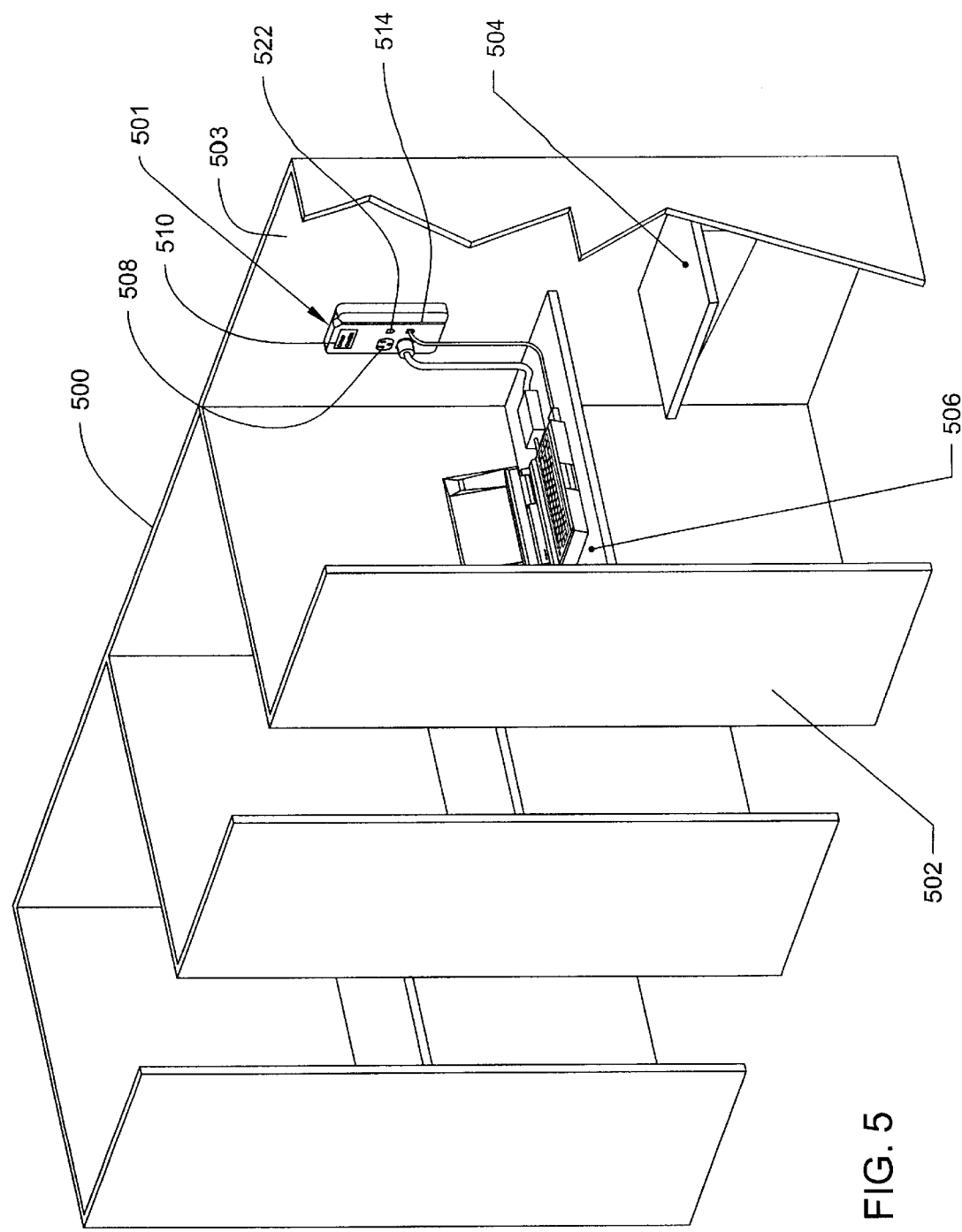
FIG. 5 is a perspective view of a fourth embodiment of the present invention configured in a telephone booth style structure.

Referring now to FIG. 5, there is illustrated a perspective view of a preferred embodiment of a standard telephone booth style structure 500 for vending power and telecommunications access. In this embodiment, the operating panel 501 is located on the side wall 503 of a vending unit 502. Panel 501 contains electrical receptacles 508, video display unit 510, telecommunications access connectors 522, and card swipe 514. This structure 500, provides a working surface 506 and a seat 504 in each unit. All other components of the vending machine are hidden within the physical structure.

In this embodiment, no payphone or telephone is present. In other embodiments, a telephone or payphone may be present for the customer's use while the vending machine is in use. This would require that the telecommunications channel used by the vending machine be separate from that of the payphone. Still another modification is to have the vending machine and the payphone share the same telecommunications channel.

Figure 6:
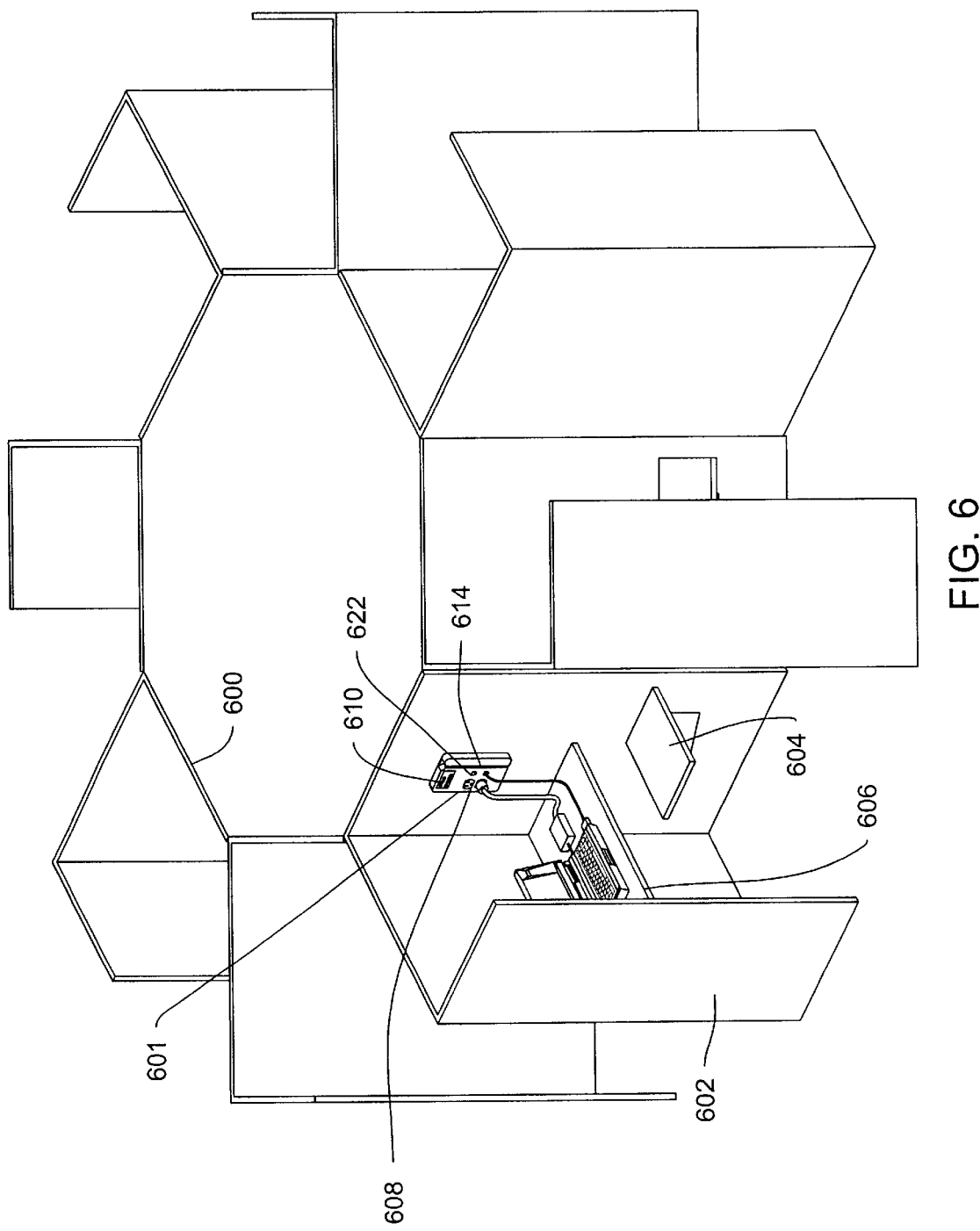
FIG. 6 is a perspective view of a fifth embodiment of the present invention configured in a kiosk structure.

Referring now to FIG. 6, there is illustrated a perspective view of a preferred embodiment of a kiosk shaped telephone booth style structure 600 for vending power and telecommunications access. In this embodiment, the operating panel 601 is located on the side wall of a vending unit 602. Panel 601 contains electrical receptacles 608, video display unit 610, telecommunications access connectors 622 and card swipe 614. This embodiment provides a working surface 606 and an adjustable seat 604 in each unit. All other components of the vending machine are hidden within the physical structure. In this embodiment, like FIG. 5, no payphone or telephone is present. In other embodiments, a telephone or payphone may be present for the customer's use while the vending machine is in use. This embodiment requires that the telecommunications channel used by the vending machine is separate from that of the payphone. It is also possible to have the vending machine and the payphone share the same telecommunications channel.

In another preferred embodiment of the vending machine in a kiosk or standard telephone booth type structure, a lockable door or locking pull-down or pull-out cover is provided which covers the equipment on the work surface 506/606 and the connections to the operating panel 501/601. This cover mechanism allows the customer to leave their equipment operating while they are otherwise occupied. In this modification, the cover can be unlocked by a key that comes with the cover or unlocked by the same credit card that is paying for the transaction.

Figure 7:
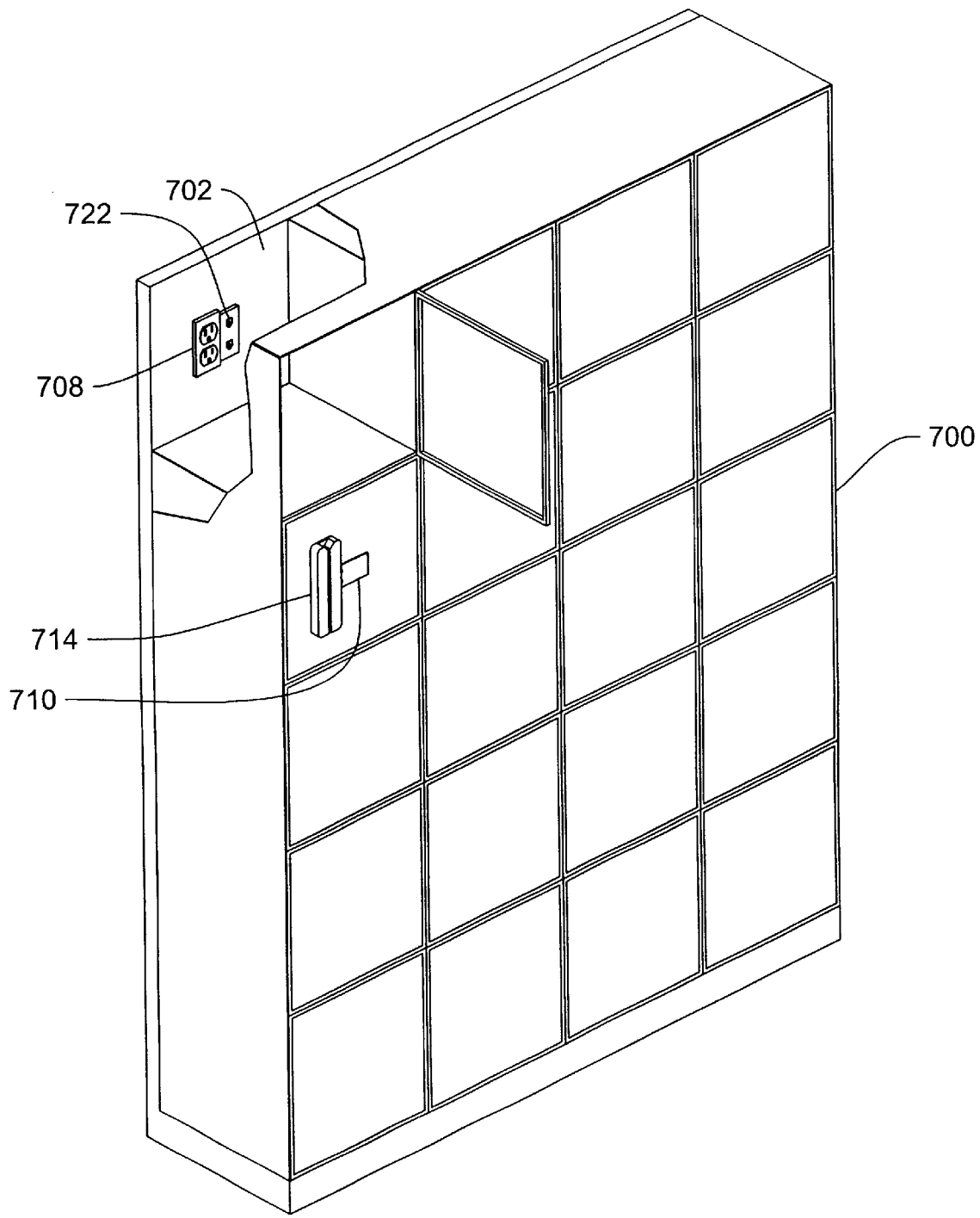
FIG. 7 is a perspective view of a sixth embodiment of the present invention configured as a storage locker.

Referring now to FIG. 7, there is illustrated a perspective view of a preferred embodiment of a storage locker 700 for vending power and telecommunications access. In this embodiment the power connectors 708 and the telecommunications channel access connectors 722 are located on the back wall of an individual storage unit 702. The payment processing unit 714 and the user interface 110 are located at the door to the unit or can otherwise be external to the storage area. All other components are hidden within the physical structure. In this embodiment, the credit card used to pay for the transaction is also used as the key to the storage unit, while another embodiment uses a standard key lock. Other embodiments of the storage locker delete the telecommunications channel access connectors and related circuits. The storage locker could be used, for example to enable the user to receive a facsimile or other inbound data.

An additional modification contemplated for all embodiments is a direct Internet connection that would allow the customer full, high speed Internet access without going through their ISP or on-line service and without the limitations of a dial-up connection. In this case, one of the telecommunication channels available at the vending machine is connected to an Internet router, terminal server or similar function and cannot be used for other communication purposes. The customer's connection to this channel is via an ethernet or other high speed port on their computer using standard Internet browser software.

In another modification of the device, it is possible that the vending machine 100 is incorporated within the mechanical structure of a telephone or payphone. In this embodiment, the payment processing unit 114 may be used to pay for the vending of power, telecommunications channel access and phone calls. The vending machine can use the telephone line connected to the telephone as the telecommunications channel. In another embodiment the vending machine has at least one telecommunications channel separate from that of the telephone. In these embodiments, the telephone and the vending machine may share the payment processing unit and, optionally, the central control unit and user interface. Furthermore, these embodiments may function autonomously and authorize the transactions themselves, or they may require approval from a central computer or central office, or a combination thereof.

When the telecommunications channel is part of the POTS network, the telecommunications access circuit 116 is generally a modem with its own intelligence and interface circuitry. Computer technology is currently changing to reduce the cost and complexity of the modem by moving the intelligence into the central control unit 106 and its program. In the future, the telecommunications access circuit may further evolve to the point where it is a built-in function within the central control unit 106.

In the preferred embodiment depicted in FIG. 2, the power provided to the customer is 115 VAC. Most of the preferred embodiments of the power and telecommunications access vending machine 100, as depicted in FIG. 1, provide at least one AC power connection and no DC power connection. However, there are some embodiments that provide at least one DC power connection without an AC power connection and still others with at least one AC power connection.

All of the embodiments of the power vending machine 200, as depicted in FIG. 3, provide at least one AC power connection. Some of these embodiments also provide at least one DC power connection.

Most of the preferred embodiments of the storage locker 700, as depicted in FIG. 7, provide at least one AC power connection and no DC power connection. However, there are some embodiments that provide at least one DC power connection without an AC power connection and still others with at least one AC power connection.

In certain embodiments of the power and telecommunications access vending machine 100 and the telecommunications vending machine 300, it is necessary for the central control unit 106 to monitor the customer's use of the telecommunications channel to determine how much to charge for the usage or to limit usage to a certain cost level. For example, this could be used when the customer is paying using software "e-money" located in their laptop. In these embodiments, the telecommunications access circuit includes circuitry that monitors the routing and address related data at the beginning of a connection. For example, if the telecommunications channel is a POTS line, the central control unit 106 monitors the call to determine the area code or country code to determine that the connection is allowed by the particular installation and, if not, to block the call by turning off the switchable telecommunications channel access circuit. Alternatively, the customer may be charged more for a call to certain locations.

Figure 8:
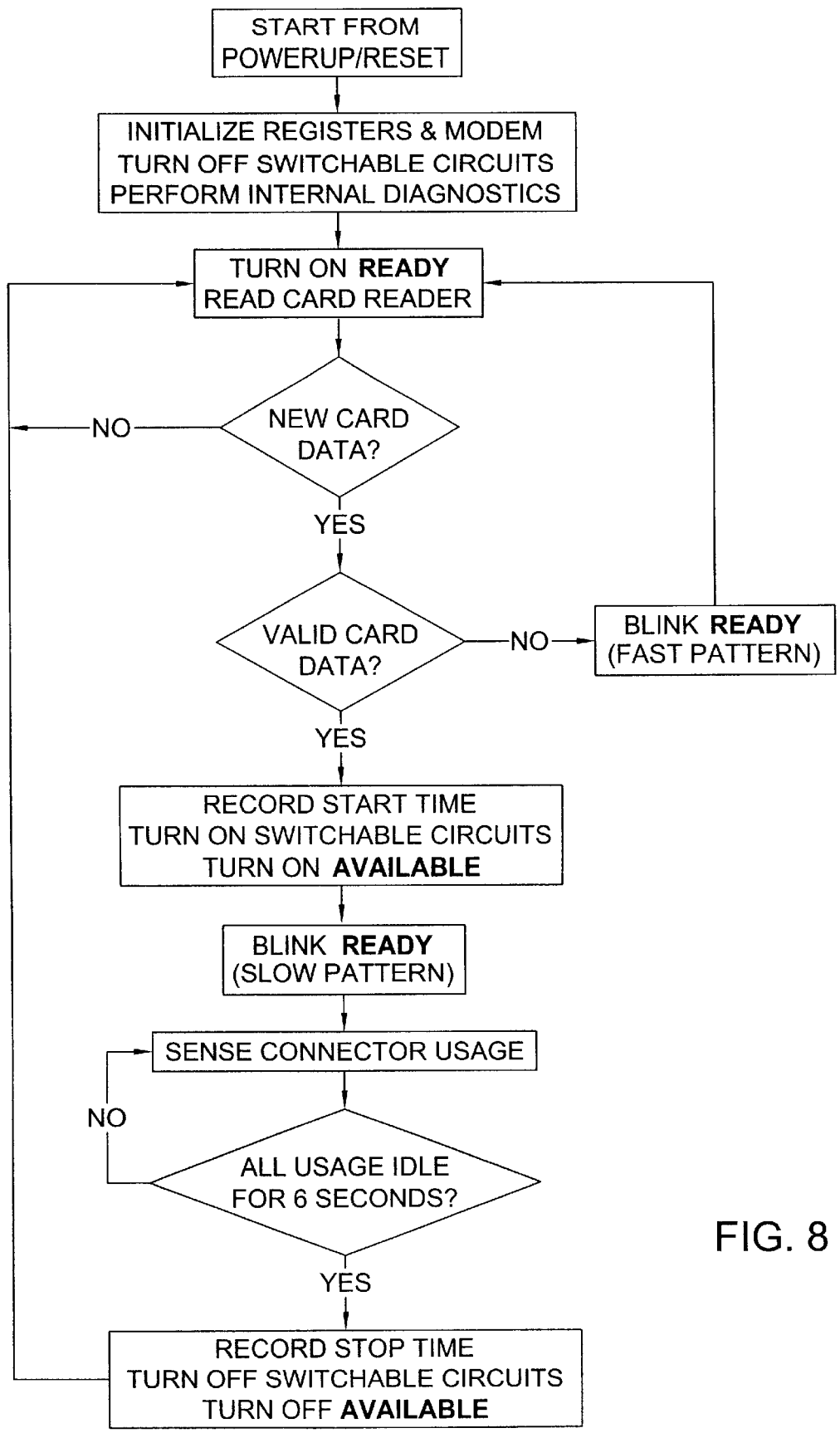
FIG. 8 is a flowchart of the main program loop within the power and telecommunications vending machine.
Figure 12:
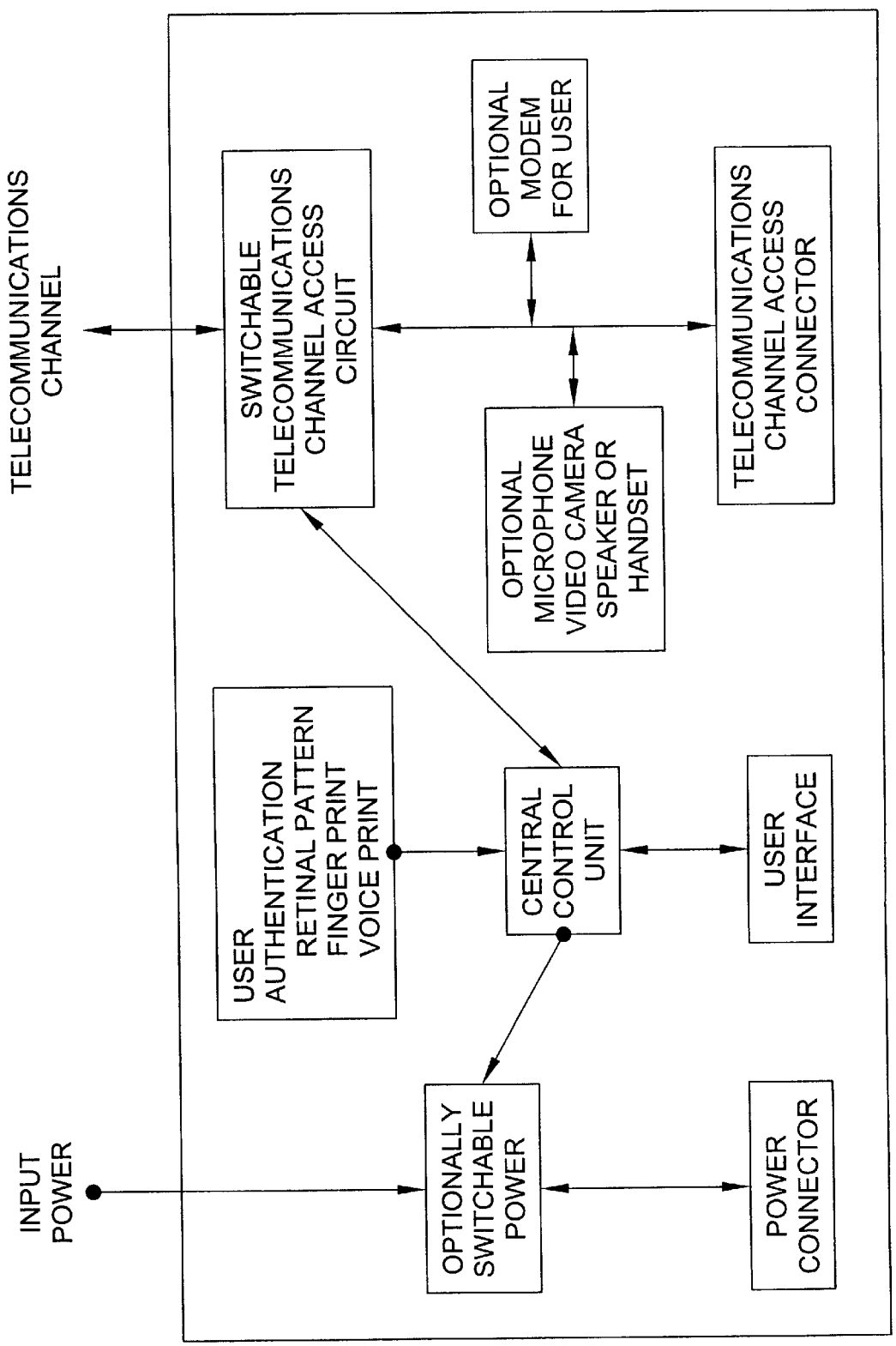
FIG. 12 is a block diagram showing an embodiment of the invention with optionally attached components.

Referring now to FIG. 8, which provides the flowchart for the main program that is executed by the central control unit 106, program execution starts when the vending machine of FIG. 2 is initially turned on. Alternatively, no switchable power is present and the power connector is always on as shown in FIG. 12. Upon power up, the program:

1. Initializes its internal registers and the telecommunications access circuit 116 so that that circuit is capable of answering incoming calls.
2. Turns off each of the switchable circuits.
3. Performs internal diagnostics to determine vending machine status.
4. Turns on the Ready light (when present) and waits for a customer to swipe a payment card at the card reader.

When the program receives new card data, it performs a series of validity checks to determine that the read operation was correct and that the card is one that the vending machine is programmed to accept. If the new card data is not acceptable, the program blinks the Ready light in the fast pattern to indicate to the customer that the customer should swipe the card again or try a different card. If the new card data is acceptable, the program starts the transaction by recording the transaction start time and turning on the switchable power circuit (when present), the switchable telecommunications channel access circuit (when present) and the Available light (when present).

Throughout the transaction, if a visual display unit is present, the program blinks the Ready light in the slow pattern and monitors the power usage and telecommunications channel usage. When the customer has stopped using both power and the telecommunications channel for six seconds, the program terminates the transaction by recording the stop time and turning off the switchable power circuit (when present), the switchable telecommunications channel access circuit (when present) and the Available light (when present).

When the program has completed all its steps, its returns to a waiting mode for the next customer to swipe their card.

Figure 9:
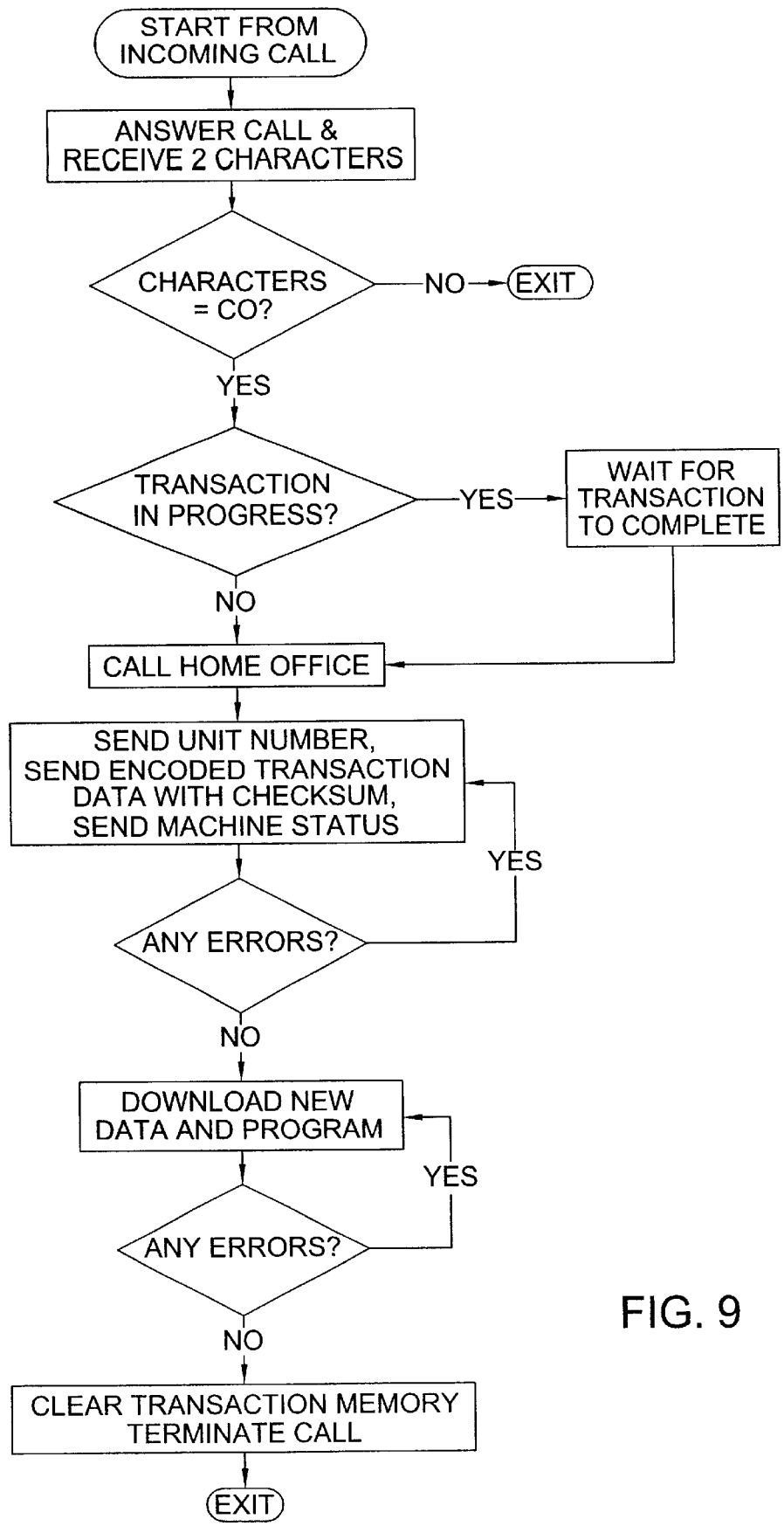
FIG. 9 is a flowchart of the program element that supports the transfer of transaction information to the central computer system.

Referring now to FIG. 9, which illustrates a flowchart for the program element that services periodic calls from a central computer, the program is activated by an interrupt generated by the modem when an incoming call is detected. The modem can only detect an incoming call if the telecommunications channel is not in use. This is not the case if bi-directional data lines are present. In this case, a single line can be used for outbound and inbound calls. The modem, by its nature, automatically answers the call and establishes a carrier with the calling computer. The program terminates the connections as soon as it receives two characters from the caller without exchanging any information. If the two characters are not CO (Call Office) the program ignores the call and waits for another incoming call. Otherwise, if a transaction is currently in progress, the program waits for the transaction to be completed.

When the transaction ends or if no transaction is in progress, the program initiates a call to the home office computer using a phone number that is resident within the program. When the home office computer answers and the modems establish a link, the program uploads its identification number, its transaction data and its status. For security, the transaction data is encoded and a checksum is appended to the message. If any errors are indicated by the home office computer, the data is repeated. After the upload is completed, the home office computer downloads any new data or program changes that it has for the vending machine. If any errors are encountered, the information is repeated.

When the download is complete, the program clears the transaction memory and reports the successful completion of this task to the home office computer. Finally this program element terminates the call and waits for the next incoming call.

Figure 10:
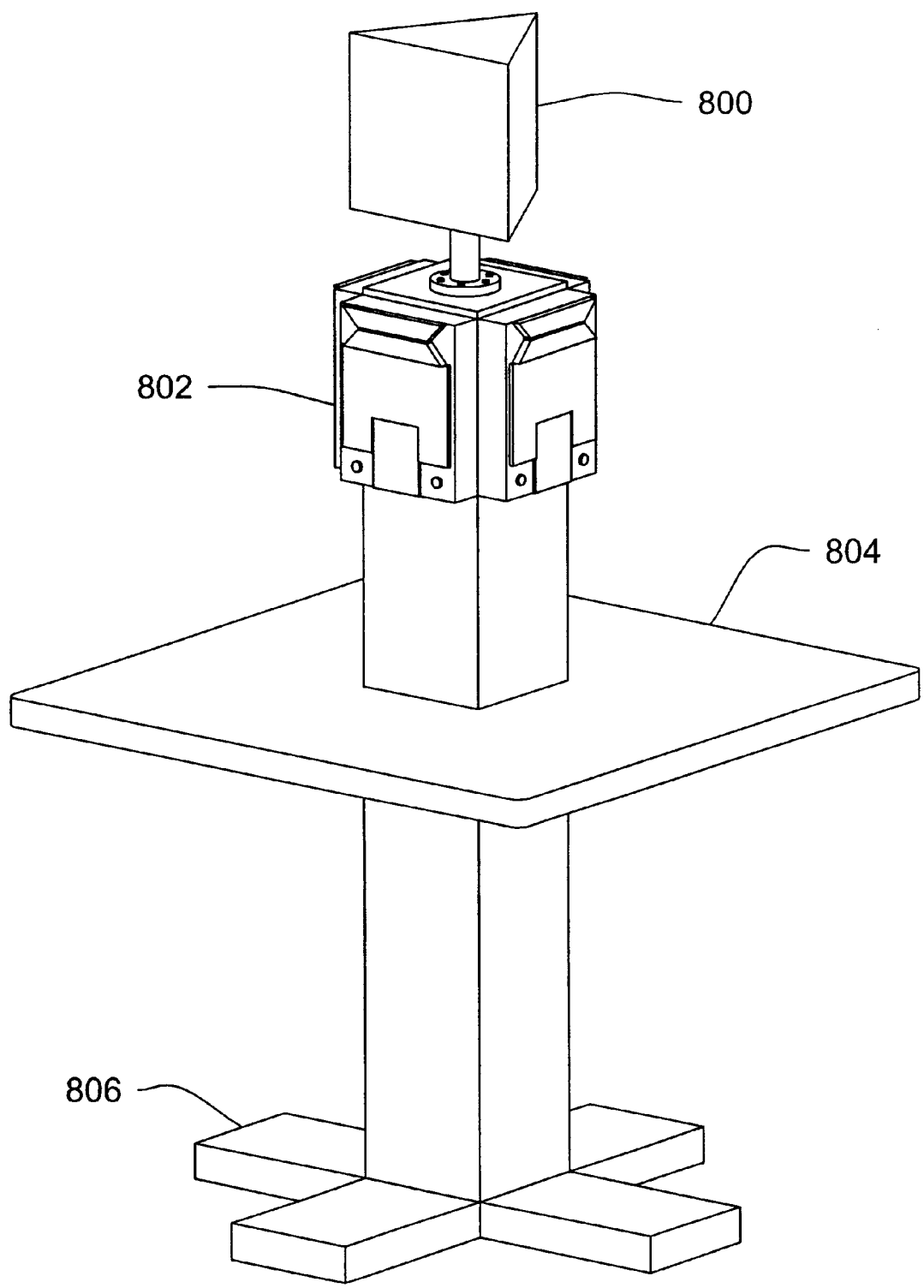
FIG. 10 is a perspective view of a free standing kiosk showing multiple vending machines.

Referring to FIG. 10, which illustrates a kiosk with access to four sides, 800 represents a sign on the kiosk, and 802 depicts the vending machine. The kiosk of this embodiment can accommodate up to four vending machines. 804 refers to a shelf where the user can place their laptop computer. Numeral 806 refers to the base of the kiosk.

Figure 11:
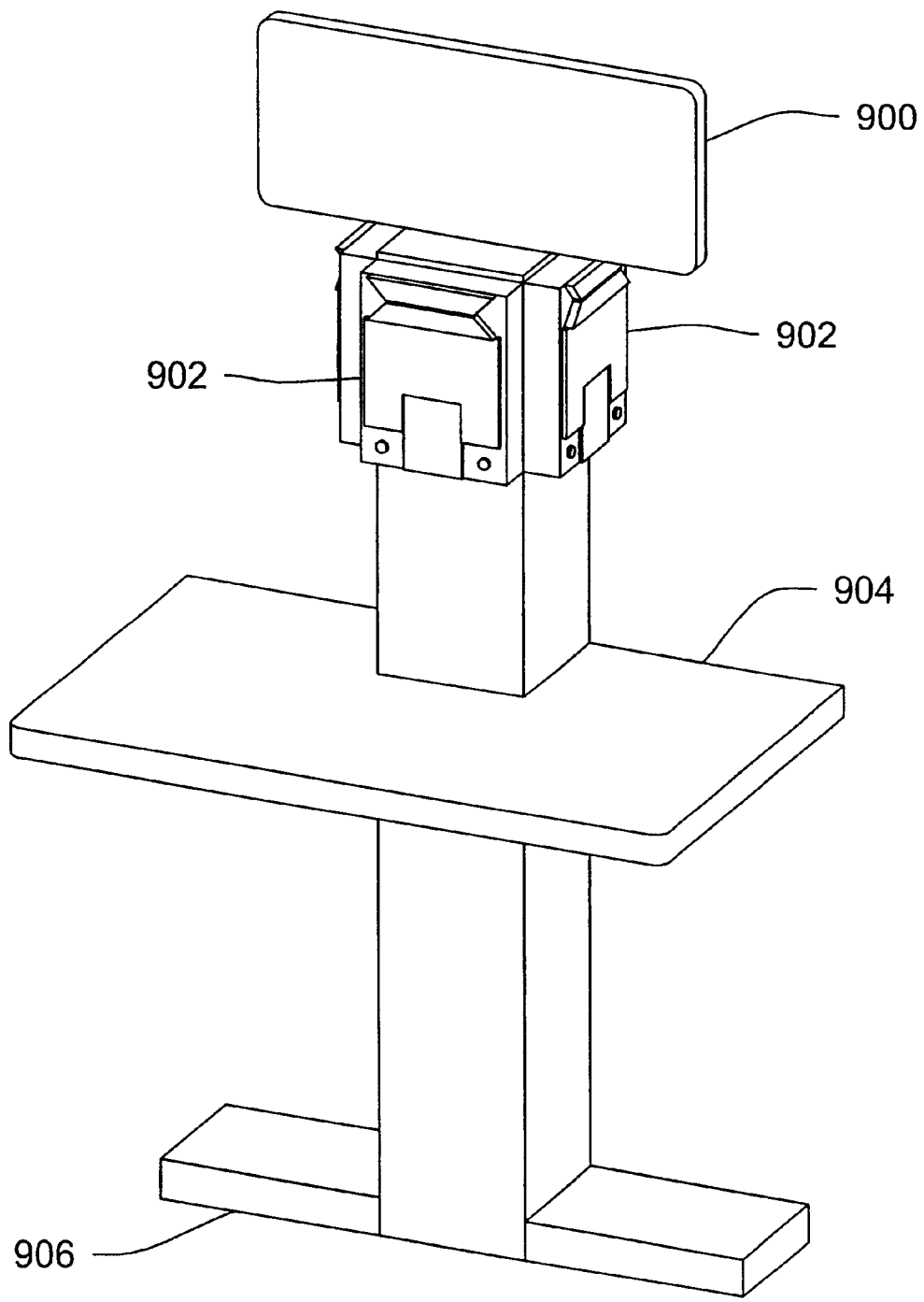
FIG. 11 is a perspective view of a kiosk designed for placement against a wall.

FIG. 11 shows another style of kiosk. This kiosk is designed for placement against a wall and accommodates up to three users. 900 represents a sign on the kiosk. 902 refers to the vending machine. The users place their laptop on shelf 904, and the unit is supported by a base 906.

FIG. 12 is a block diagram showing additional features of the invention. In this diagram, the power circuit may either be switchable or always in the "on" position. Customers may initiate vending machine access using user authentication methods such as retinal pattern, finger print or voice print identification. In a further embodiment, a video camera can provide video phone capability. Either a microphone/speaker combination or handset can provide Internet phone access.

It is to be understood that although the present invention has been described with regard to preferred embodiments thereof, various other embodiments and variants may occur to those skilled in the art, which are within the scope and spirit of the invention, and such other embodiments and variants are intended to be covered by the following claims.

What is claimed is:

1. A vending machine for vending telecommunications channel access and power to a customer, said vending machine comprising:
    a payment mechanism for receiving payment from the customer;
    a customer interface for indicating the status of said vending machine;
    an electronic circuit for determining when the vending transaction is completed;
    a power connector to supply power to at least one external electronic device of the customer;
    a telecommunications channel access circuit adapted to be connected to at least one external telecommunications channel for enabling access to the at least one external telecommunications channel at the beginning of a vending transaction and disabling access at the end of the vending transaction;
    a telecommunications channel access connector connected to said telecommunications channel access circuit for enabling connection to an external telecommunications device of the customer; and
    a control unit having a storage device for storing payment information received from the customer and for controlling said electronic circuit and said telecommunications channel access circuit.

2. A vending machine as claimed in claim 1, wherein said payment mechanism is a cash payment receiving mechanism.

3. A vending machine as claimed in claim 1, wherein said payment mechanism is an electronic payment mechanism.

4. A vending machine as claimed in claim 3, wherein said electronic payment mechanism comprises at least one of a credit card, debit card, smart card, prepaid card and RF ID card.

5. A vending machine as claimed in claim 3, wherein said electronic payment mechanism comprises a device for reliably authenticating the customer.

6. A vending machine as claimed in claim 5, wherein said device for reliably authenticating the customer comprises a fingerprint recognition device.

7. A vending machine as claimed in claim 5, wherein said device for reliably authenticating the customer comprises a voice recognition device.

8. A vending machine as claimed in claim 5, wherein said device for reliably authenticating the customer comprises a retinal pattern recognition device.

9. A vending machine as claimed in claim 3, wherein said electronic payment mechanism comprises a device for authorizing a billing transaction.

10. A vending machine as claimed in claim 9, wherein said device for authorizing the billing transaction is a separate billing computer.

11. A vending machine as claimed in claim 9, wherein said device for authorizing the billing transaction comprises a billing computer located within the vending machine.

12. A vending machine as claimed in claim 1, wherein said customer interface comprises at least one light on a surface of said vending machine.

13. A vending machine as claimed in claim 1, wherein said customer interface comprises a video display unit on a surface of said vending machine.

14. A vending machine as claimed in claim 1, wherein said customer interface comprises an auditory signal generated by said vending machine.

15. A vending machine as claimed in claim 1, wherein said customer interface a mechanism that interfaces with software supplied by the customer.

16. A vending machine as claimed in claim 1, wherein said customer interface comprises a card reader for approving a card supplied by the customer.

17. A vending machine as claimed in claim 1, wherein said telecommunications channel access circuit is switchable.

18. A vending machine as claimed in claim 1, further comprising a switchable power circuit for turning power on at the beginning at a vending transaction and off at the end of the vending transaction.

19. A vending machine as claimed in claim 1, wherein said telecommunications access channel connector comprises a high bandwidth channel connector.

20. A vending machine as claimed in claim 19, wherein said telecommunications access channel connector comprises a fiber optic line connector.

21. A vending machine as claimed in claim 19, wherein said telecommunications access channel connector comprises a copper line connector.

22. A vending machine as claimed in claim 19, wherein said telecommunications channel access connector comprises an infrared connector.

23. A vending machine as claimed in claim 1, wherein said telecommunications access channel connector comprises a local telephone line connector.

24. A vending machine as claimed in claim 19, wherein said telecommunications access channel connector comprises a local telephone line connector.

25. A vending machine as claimed in claim 1, wherein said telecommunications access channel connector is adapted to be connected to a dial-up telephone line.

26. A vending machine as claimed in claim 1, wherein said telecommunications access channel connector comprises an RJ-11 connector.

27. A vending machine as claimed in claim 23, wherein said telecommunications channel access connector further comprises an RJ-11 connector.

28. A vending machine as claimed in claim 1, wherein said telecommunications channel access connector further comprises a fiber optic line connector.

29. A vending machine as claimed in claim 1, wherein said telecommunications channel access connector further comprises an infrared line connector.

30. A vending machine as claimed in claim 1, further comprising a modem disposed in said vending machine.

31. A vending machine as claimed in claim 19, further comprising a modem disposed in said vending machine.

32. A vending machine as claimed in claim 1, wherein said telecommunications channel access circuit is adapted to be connected to a direct Internet connection via an Internet Service Provider selected by the vending machine.

33. A vending machine as claimed in claim 1, wherein said telecommunications channel access circuit is adapted to be connected to a direct Internet connection via an Internet Service Provider selected by the customer.

34. A vending machine as claimed in claim 1, further comprising a microphone and a speaker disposed in said vending machine and said microphone and said speaker are adapted to transmit and receive voice communications over the external telecommunications channel.

35. A vending machine as claimed in claim 1, further comprising a video camera connected to said vending machine to send video images over the external telecommunications channel.

36. A vending machine as claimed in claim 1, wherein said telecommunications channel access connector comprises a transceiver to connect wirelessly to an external telecommunications device of the customer.

37. A vending machine as claimed in claim 36, wherein said transceiver is an infrared transceiver.

38. A vending machine as claimed in claim 1, further comprising means for supplying electrical power having an alternating current to said power connector.

39. A vending machine as claimed in claim 38, wherein the alternating current is 120 Volts at 60 Hertz.

40. A vending machine as claimed in claim 1, wherein said power connector is a first power connector and said vending machine further comprises a second power connector.

41. A vending machine as claimed in claim 40, further comprising means for supplying electrical power to said first power connector, said means for supplying electrical power supplying a current that is the same as the current supplied to the vending machine and said second power connector comprises means for supplying an alternating current having 120 Volts at 60 Hertz.

42. A vending machine as claimed in claim 1, further comprising a power conversion circuit, wherein said power connector receives power from said power conversion circuit to supply power to the at least one external electronic device of the customer.

43. A vending machine as claimed in claim 40, comprising means for supplying electrical power to said first power connector and means for supplying electrical power to said second power connector, said means for supplying electrical power to said first power connector supplying an alternating current and said means for supplying electrical power to said second power connector supplying electrical power having a direct current.

44. A vending machine as claimed in claim 1, further comprising an electrical generation device for supplying said vending machine with power when locally supplied electricity is not available.

45. A vending machine as claimed in claim 1, wherein said control unit is located remote from said vending machine.

46. A vending machine as claimed in claim 1, wherein said power connector is located remote from said vending machine.

47. A vending machine as claimed in claim 45, wherein said telecommunications channel access circuit is located remote from said vending machine.

48. A vending machine as claimed in claim 1, wherein said control unit further comprises circuitry for controlling a plurality of vending machines.

49. A vending machine as claimed in claim 1, wherein the vending machine is disposed within a booth.

50. A vending machine as claimed in claim 1, wherein the vending machine is disposed on a kiosk.

51. A vending machine as claimed in claim 50, wherein a plurality of vending machines are present on said kiosk so that multiple users can simultaneously use each of said plurality of vending machines.

52. A vending machine as claimed in claim 1, wherein said vending machine is disposed within a storage locker.

53. A vending machine as claimed in claim 1, wherein said vending machine is disposed on a wall mounting device.

54. A vending machine as claimed in claim 1, further comprising a power circuit wired to a building so that said power connector can be located remote from the vending machine.

55. A vending machine as claimed in claim 54, further comprising a combustible fuel delivery device connected to said power connector so that said vending machine is capable of vending combustible fuel from said combustible fuel holding device.

56. A vending machine as claimed in claim 54, wherein said power connector is connected to a steam supply mechanism for vending steam to the building.

57. A vending machine as claimed in claim 54, wherein said power connector is connected to a hydrocarbon supply mechanism for vending hydrocarbons to the building.

58. A vending machine as claimed in claim 54, said power connector is connected to a natural gas supply mechanism for vending natural gas to the building.

59. A vending machine as claimed in claim 54, said power connector is connected to a electricity supply mechanism for vending electricity to the building.

60. A vending machine as claimed in claim 1, wherein said telecommunications channel access circuit is wired to a building so that the external telecommunications channel can be located remotely from said vending machine to vend telecommunications to the building.

61. A vending machine as claimed in claim 1, further comprising a plurality of power connectors for supplying a plurality of types of power.

62. A vending machine as claimed in claim 61, wherein said plurality of power connectors comprise a low current connector and a high current connector to supply low current and high current.

63. A vending machine as claimed in claim 62, further comprising an electronic card reader that activates said high current connector to power building maintenance devices.

64. A vending machine as claimed in claim 63, wherein said electronic card reader further comprises a time and date recording device for recording the time and date in order to monitor work progress of building maintenance personnel.

65. A vending machine as claimed in claim 1, wherein said telecommunications channel access circuit comprises at least two different types of data lines.

66. A vending machine as claimed in claim 65, wherein said data lines include at least two of T1, ISDN, xDSL, broadband, baseband, ethernet and Appletalk™.

\* \* \* \* \*